Figure 1:
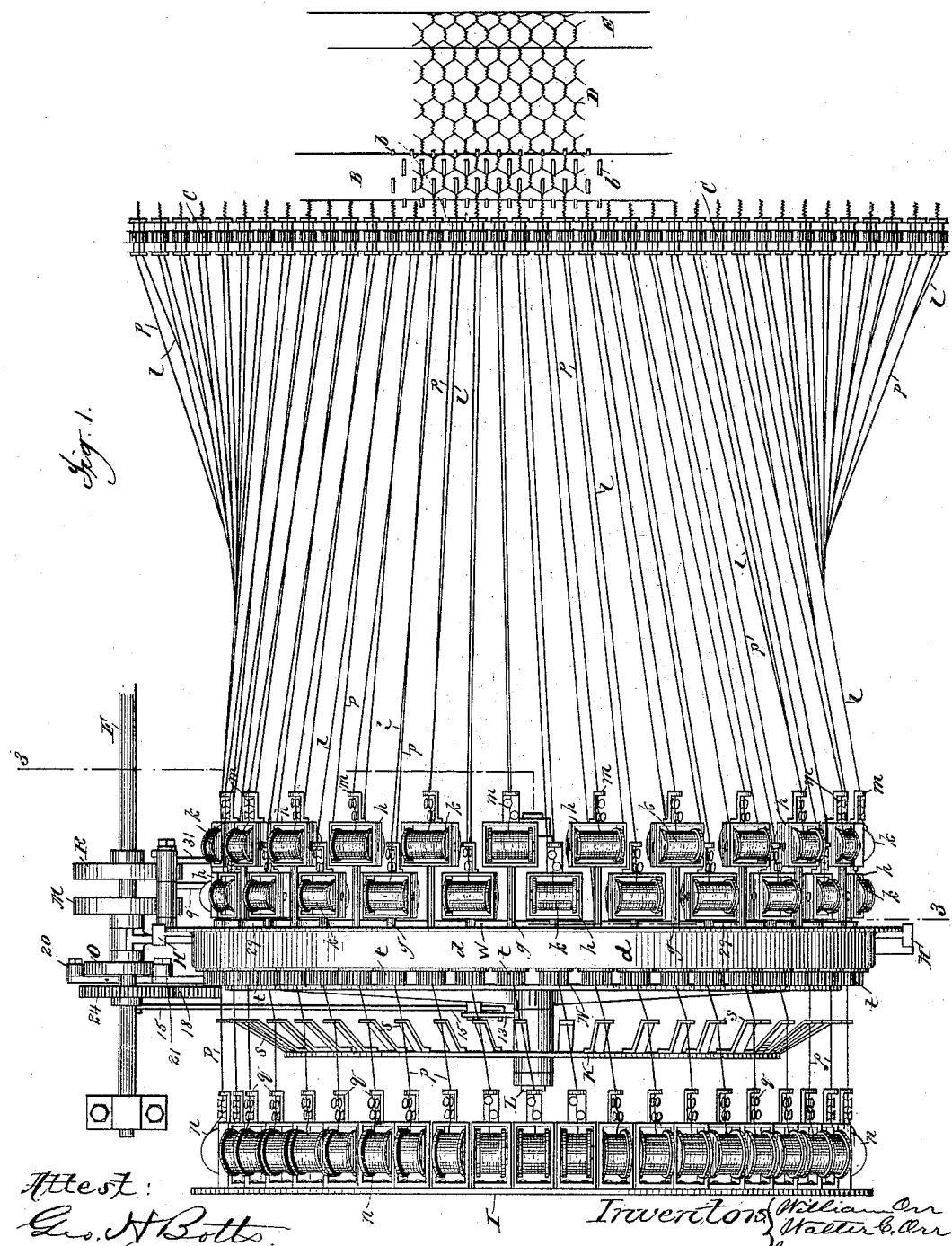

(No Model.) 7 Sheets—Sheet 1.

W. & W. C. ORR.
WIRE NETTING MACHINE.

No. 417,934. Patented Dec. 24. 1889.

Attest:
Geo. H. Botts
J. J. Kennedy

Inventors
William Orr
Walter C. Orr
By Philipp Philipp Hoop
Attys (No Model.)  7 Sheets—Sheet 2.

W. & W. C. ORR.
WIRE NETTING MACHINE.

No. 417,934.  Patented Dec. 24, 1889.

Attest:
Geo. H. Roth
J. J. Kennedy

Inventors:
William Orr
Walter C. Orr
By Philipp Phelps & Hovey
Attys (No Model.) 7 Sheets—Sheet 3.

W. & W. C. ORR.
WIRE NETTING MACHINE.

No. 417,934. Patented Dec. 24, 1889.

Attest:
Geo. H. Botts
J. J. Kennedy

Inventors.
William Orr
Walter C. Orr
By Philipp Phelps & Hovey
Attys (No Model.) 7 Sheets—Sheet 4.
W. & W. C. ORR.
WIRE NETTING MACHINE.
No. 417,934. Patented Dec. 24, 1889.
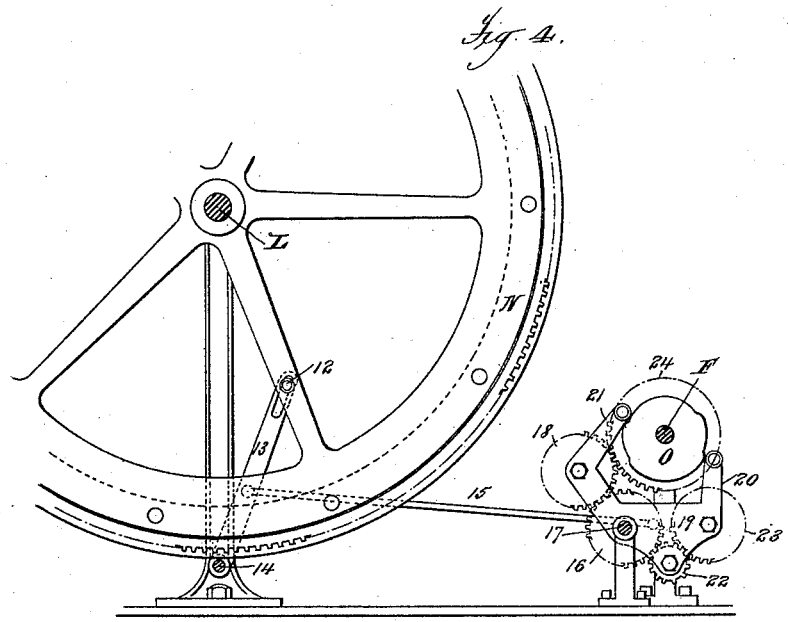
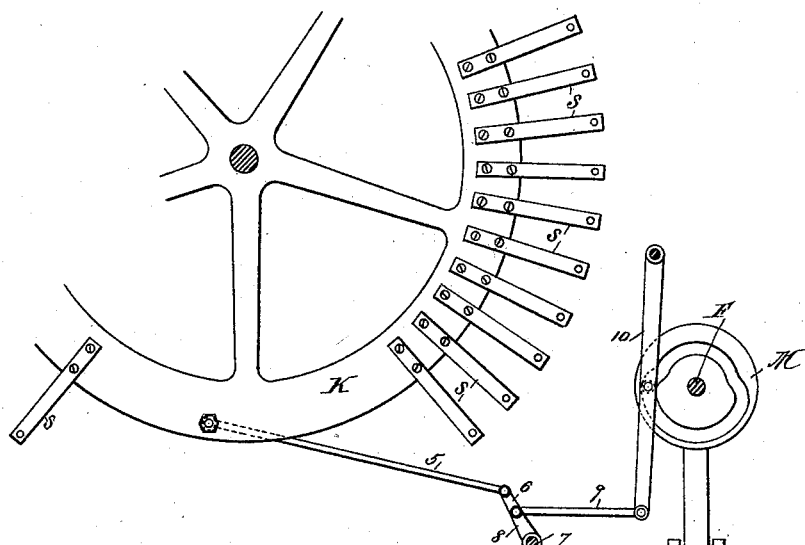

(No Model.)  7 Sheets—Sheet 5.
W. & W. C. ORR.
WIRE NETTING MACHINE.
No. 417,934.  Patented Dec. 24, 1889.
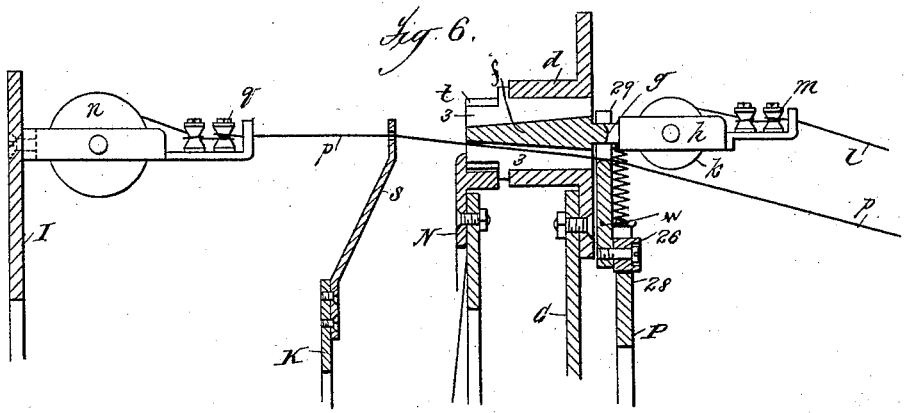
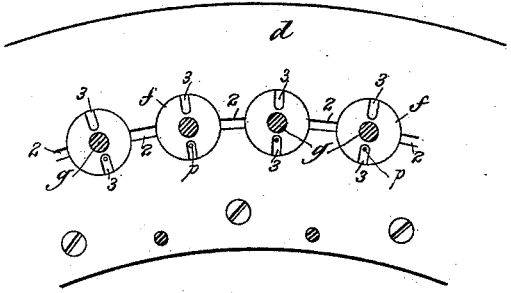
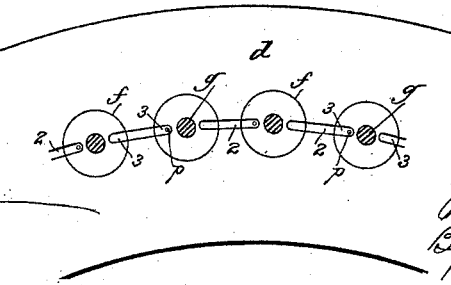
Attest:
Geo. H. Bott
J. J. Kennedy
Inventors:
William Orr
Walter C. Orr
By Philipp Philipp Hoore
Attys (No Model.) 7 Sheets—Sheet 6.
W. & W. C. ORR.
WIRE NETTING MACHINE.
No. 417,934. Patented Dec. 24, 1889.
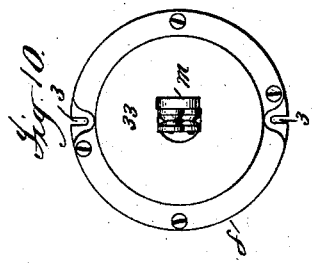
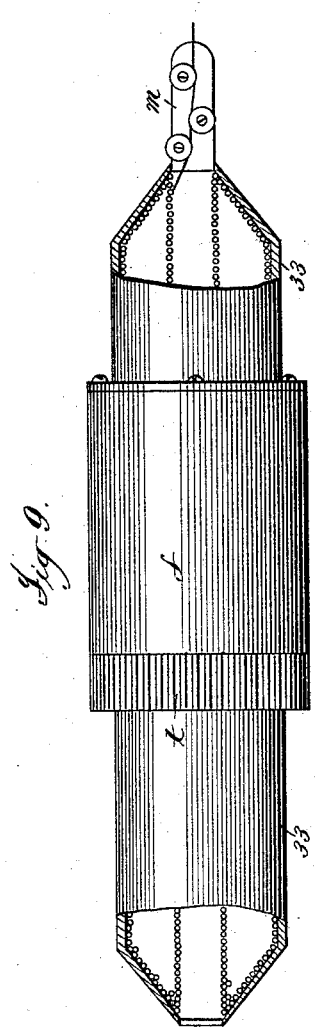
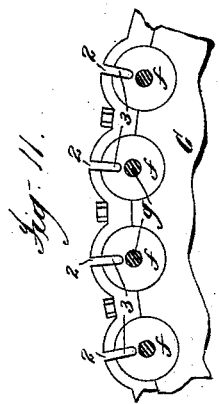
Attest:
Geo. H. Botts.
J. J. Kennedy
Inventors
William Orr
Walter C. Orr
By Philipp, Philipp & Hovey
Attys (No Model.) 7 Sheets—Sheet 7.
W. & W. C. ORR.
WIRE NETTING MACHINE.
No. 417,934. Patented Dec. 24, 1889.
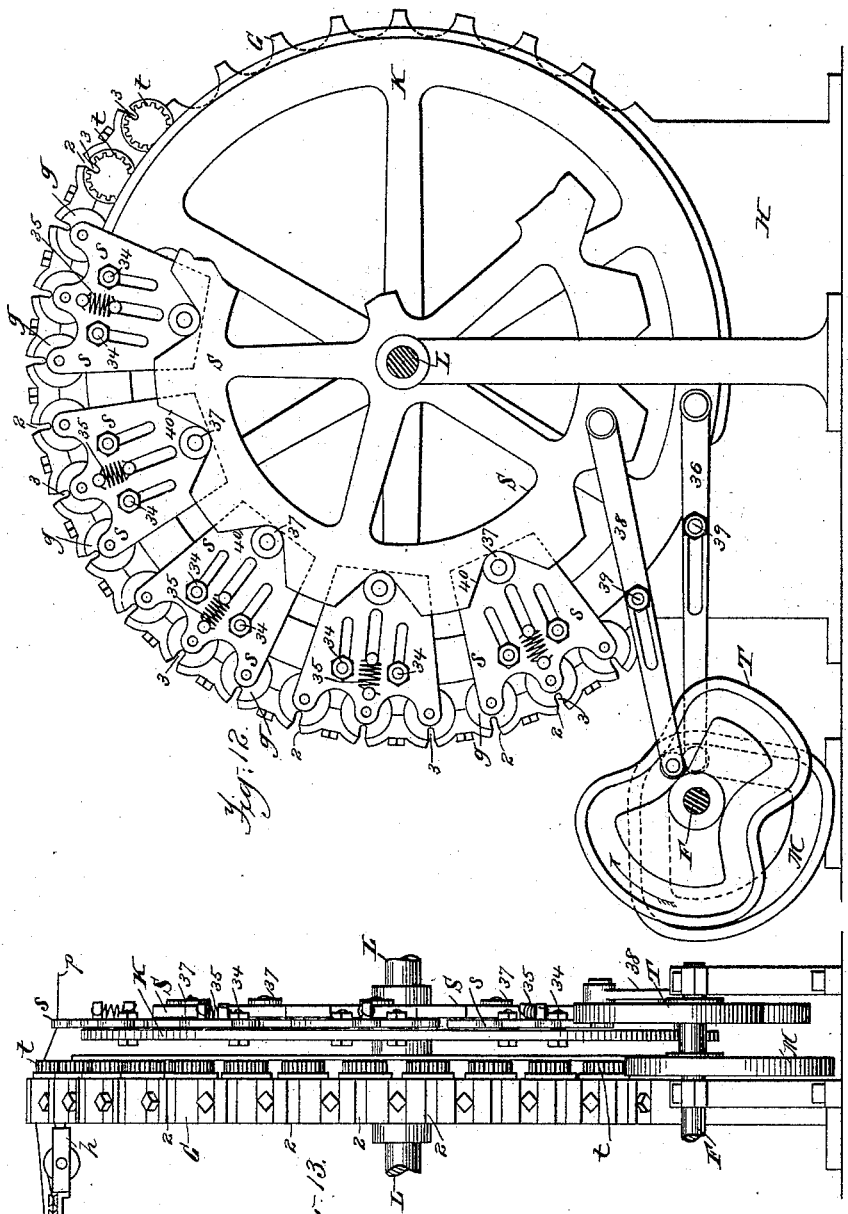

UNITED STATES PATENT OFFICE.

WILLIAM ORR AND WALTER C. ORR, OF TRENTON, NEW JERSEY.

WIRE-NETTING MACHINE.

SPECIFICATION forming part of Letters Patent No. 417,934, dated December 24, 1889.

Application filed March 27, 1889. Serial No. 305,007. (No model.)

*To all whom it may concern:*

Be it known that we, WILLIAM ORR and WALTER C. ORR, citizens of the United States, residing at Trenton, county of Mercer, and State of New Jersey, have invented certain new and useful Improvements in Wire-Netting Machines, fully described and represented in the following specification and the accompanying drawings, forming a part of the same.
Our invention relates to a machine for the manufacture of that class of wire-netting having hexagonal meshes, and in which four sides of each mesh are formed of single wires, while the remaining two sides of each mesh are formed of two or more wires twisted together. Such netting is commonly provided with an approximately straight selvage, generally composed of two or more wires twisted together, and in some instances the netting of this class is provided with straight longitudinal wires, which pass through the centers of the meshes to assist in resisting elongation of the meshes, and in such case the longitudinal wires are twisted with the mesh-wires, so that the twisted sides of the meshes consist of three wires.

In the machines for making this class of netting as ordinarily organized the twist of the wires is effected by means of split twisting-gears, through which the wires are passed and which are shifted with relation to each other to properly accomplish the twisting together of the wires.

In order to provide for the carrying of one half of the wires around the other half during the twisting operation, which is necessary in order to maintain the wires in proper condition, it has been customary to lead the alternate wires of the series to the twisting-gears from the bobbins, which are supported in any suitable position, while the remaining or alternate wires of the series are led from coils contained in or wound upon long cylinders or tubes located between the bobbins and twisting-gears, the wires from the bobbins being led to and along the several tubes in such position that by revolving the tubes they, together with the coils of wire which they contain, are carried around the wires from the bobbins during the twisting operation and thus maintain the wires in proper condition. These organizations have been objectionable on account of the limited space afforded for the coils of wire contained within or around the tubes before mentioned, the diameter of which coils must be less than the distance from center to center of the twists at the opposite sides of the meshes, or, in other words, less than the distance from center to center of the adjacent twisting-gears. From this it has resulted that it has been impossible for the coils to contain more than a comparatively small quantity of wire, which, in the operation of the machine, became quickly exhausted, thus necessitating frequent stoppages of the machine for the replenishing of the coils. Attempts have been made to overcome this objectionable feature and thus increase the productive capacity of this class of machines, none of which have, however, proved entirely satisfactory in practice.

It is the object of the present invention to provide an organized machine for the production of wire-netting in which the foregoing objectionable features shall be obviated, and in which a sufficient supply of wire can be provided to render unnecessary frequent stoppages of the machine and thus increase its productive capacity.

The invention also has for its object to improve the machine in various other particulars, all of which will be hereinafter fully explained and particularly pointed out.

Figure 2:
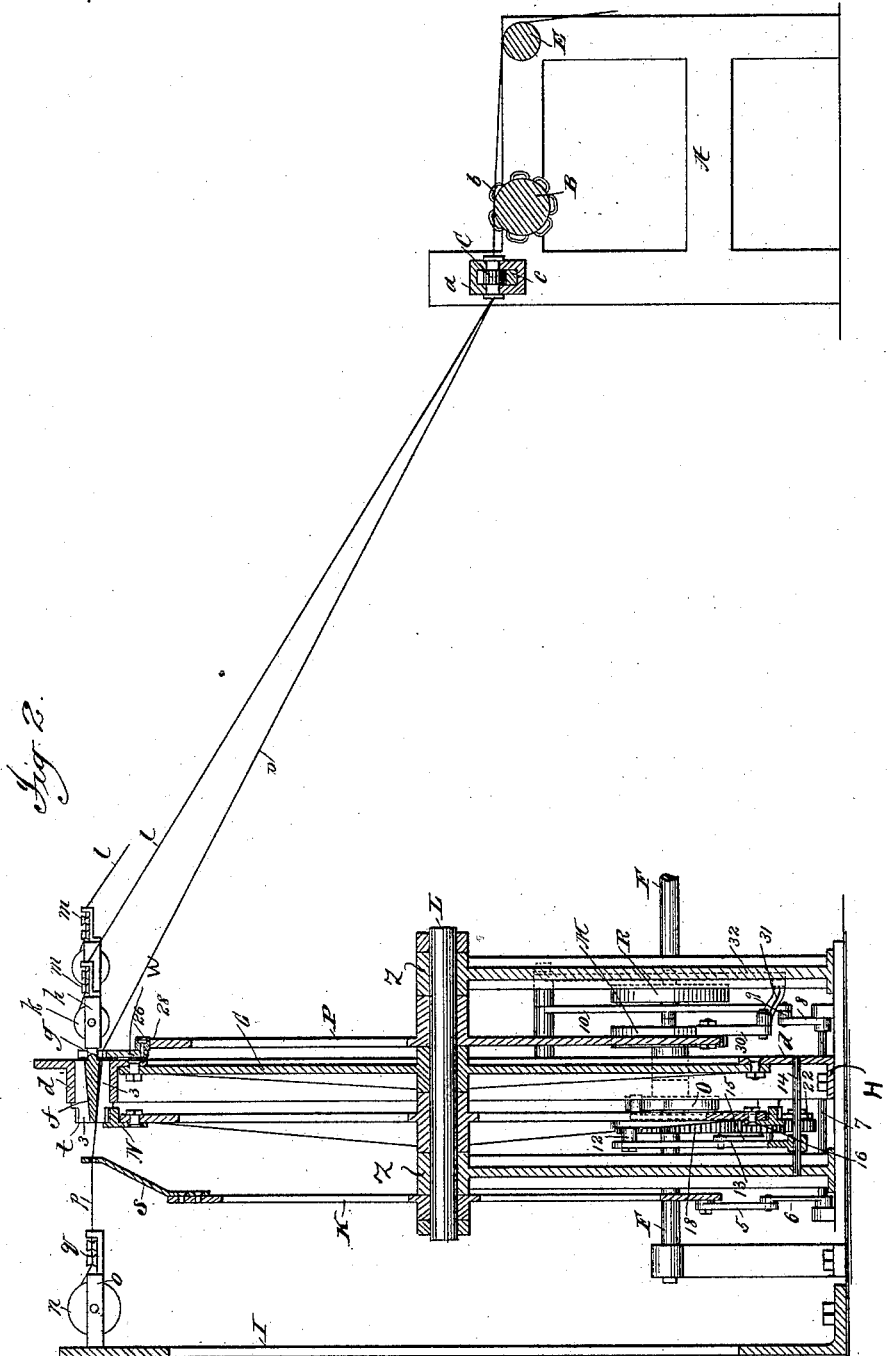
Figure 3:
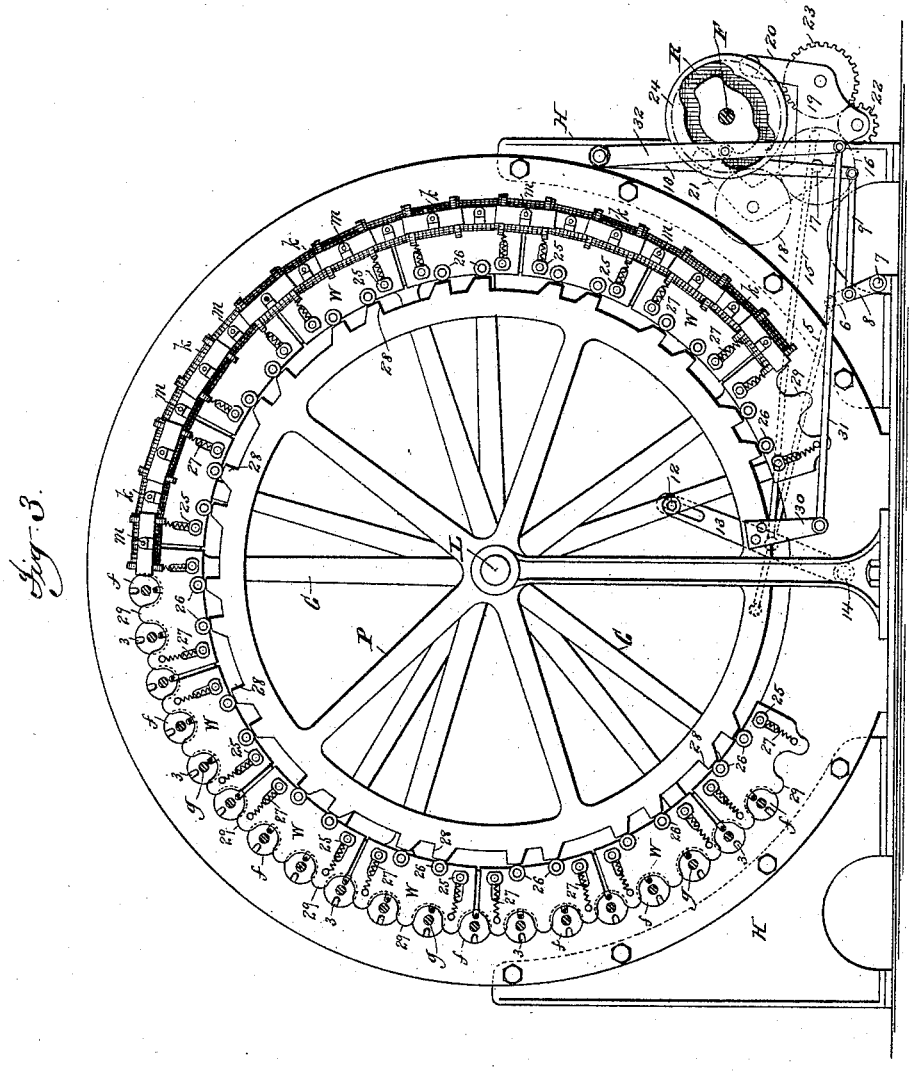

In the accompanying drawings, Figure 1 is a plan view of so much of a wire-netting machine as is necessary to illustrate the application of our improvements thereto. Fig. 2 is a longitudinal vertical section of the same. Fig. 3 is a vertical cross-section taken on the line 3 of Fig. 1. Figs. 4 to 8 illustrate details which will be hereinafter referred to. Fig. 9 is an enlarged view showing a modification in the means for carrying the wires. Fig. 10 is an end view looking from the right of Fig. 9. Figs. 11, 12, and 13 illustrate another modification which will be hereinafter referred to, Fig. 13 being an edge view of the parts shown in Fig. 12, and Fig. 11 a sectional detail showing the bobbin or cop carriers.

Referring to said drawings, it is to be understood that A represents a suitable framework supporting the mesh-forming mechanism, which mechanism is of substantially the usual character. This mesh - forming mechanism consists, primarily, of a mesh-shaping roll B, which is provided with the usual staples or pins b for determining the size and form of mesh, and the usual series of split gears C for effecting the twisting. The gears C and their journals are divided in the usual manner and each half is provided with an opening, through which passes one of the wires of the series employed in the formation of the netting.

a represents the sliding bar for shifting the gears in the usual manner, and c the rack-bar for revolving the gears to effect the twisting. The netting D, after leaving the shaping-roll B, passes over a leading-roll E, and thence to a wind-up roll, upon which the completed netting is wound, the latter roll not being shown in the drawings.

The various parts of the mesh-forming mechanism are suitably driven and properly timed with relation to each other and to the remaining parts of the mechanism, which will be hereinafter described, from the main driving-shaft F, with which they are connected in any suitable manner.

Located at a suitable distance in the rear of the range of gears C is a circular frame G, which is rigidly supported in any suitable manner—as, for example, by flanges H, rising from the bed of the machine. This frame G is provided around its periphery with horizontal bearings d for a series of bobbin-carriers f, equal in number to one-half of the wires employed in forming the netting. Extending from the fronts of the bobbin-carriers f are spindles g, which support frames h, in which are mounted bobbins k, containing the wire. The wires l, as they are led from the bobbins k, pass around suitable tension devices m, attached to the frames h, and are led thence directly to the split gears C, the wires from the several bobbins k passing through the openings in one member of the respective gears. The spindles g are made of different lengths, as best shown in Fig. 1, so as to permit the frame h and bobbins k to overlap each other, and by this means the size and capacity of the bobbins can be increased to such an extent as to permit each bobbin to carry a comparatively large quantity of wire and thus avoid the necessity of frequently stopping the machine to replenish the bobbins. The frame G is provided with a series of slots 2, (see Figs. 7 and 8,) which extend entirely through the frame from front to rear, and afford communication between the adjacent bearings d of the bobbin-carriers f, and the bobbin-carriers f are provided upon their opposite sides with recesses 3, which are so positioned that when the bobbin-carriers are in their normal position they register with the slots 2, as indicated in Fig. 8. The purpose of this will appear when the operation of the machine is explained. It has already been stated that one-half of the wires required for the formation of the netting are carried by the bobbins k. The remaining one-half of the required wires are carried by bobbins n, which are supported in suitable frames o, extending from the front of a vertical plate or frame-work I, located in the rear of the frame G. The wires p, led from the bobbins n, pass around suitable tension devices q, similar to the tension devices n, and after passing through openings in the arms s of a shifting device, which will be hereinafter explained, they pass through the slots 2, between the respective bobbin-carriers f, and are led thence to and passed through the openings in the other members of the respective twisting-gears C. By this means it will be seen that the wires p alternate with the wires l.

Located in the rear of the frame G and between it and the frame I is a circular disk or frame K, which is mounted to turn freely upon a shaft L, which passes through the frame G and is supported in suitable standards Z, rising from the base of the machine. Located around the periphery of the disk K are a series of arms s, having openings through which the wires p pass, as before explained, and which form the shifting device for the wires p.

For the purpose of shifting the wires p an oscillating motion is imparted to the disk K and arms s. To accomplish this the disk K (see Figs. 1, 2, 3, and 5) is connected to a rod 5, which is pivoted to a rock-arm 6, extending from a rock-shaft 7 and having a second arm 8, which is connected by a link 9 to a lever 10, mounted upon the main shaft F, the cam M being so shaped as to impart an oscillating motion to the disk K, first in one direction and then in the other, at each revolution of the shaft F. The motion thus imparted to the disk K in each direction is equal or about equal to the distance between the centers of the adjacent bobbin-carriers f, so that as the disk is oscillated in one direction the wires p will be shifted from the slots 2 into the recesses 3 upon one side of the bobbin-carriers, which are in register with one end of the slots, while as the disk K is oscillated in the reverse direction the wires will be carried out of the recesses 3, in which they are resting, and through the slots 2 into the corresponding recesses upon the opposite sides of the adjacent carriers. The parts are so timed that this shifting of the wires p will take place between the consecutive twisting operations.

In order to impart the necessary rotation to the bobbin-carriers f to conform to the twist given to the wires by the twisting-gears, the bobbin-carriers are extended rearward through their bearings d and are provided with gears t, which are recessed to correspond to the recesses 3 of the carriers and are engaged by a large gear N, which is mounted to turn freely upon the shaft L and receives an oscillating motion, first in one direction and then in the other, to impart a rotary motion to the bobbin-carriers and their bobbins, corresponding in time, direction, and number of revolutions to the movement given to the twisting-gears by the rack c.

The necessary oscillating movement is imparted to the gear N as follows: The gear is provided with a stud 12, (see Figs. 1, 2, 3, and 4,) which enters and works in a slot formed in the end of a rock-arm 13, which is fulcrumed upon a shaft 14 and is connected by a rod 15 with a crank-pin extending from the face of a gear 16, mounted upon a short shaft 17. The gear 16 engages with a gear 19, which is mounted to rock upon the shaft 17 and is provided with two arms 20 21, having studs or bowls which are acted upon by a cam O, mounted upon the driving-shaft F. The gear 16 also engages through an intermediate 22 with a gear 23, similar in size to the gear 18, the gears 22 23 being also mounted upon studs projecting from the frame 19. The cam O and the frame 19 are so formed that as the frame is rocked by the cam the gears 18 23 will be alternately brought into and out of engagement with a gear 24, mounted upon the shaft F, thus, as will be seen, causing the gear N to be alternately oscillated in one direction and then in the other. The cam O is so formed that each of the gears 18 23 will remain in engagement with the gear 24 for about one-third of a revolution of said gear 24, and the gears are so proportioned that these periods of engagement will be sufficient to impart a half-revolution to the gear 16, first in one direction and then in the other. The cam O is, however, so formed that between each engagement of the gear 18 and the subsequent engagement of the gear 23, and vice versa, there will be a short period, (about one-sixth of a revolution of the shaft F,) during which both the gears 18 23 will be out of engagement with the gear 24, and during this period the gear N will remain at rest. It is during these periods of rest of the gear N that the cam M operates to oscillate the disk K and shift the wires p, as before explained, and it is also during this period that the bar a is operated to shift the split gears C, as also before explained. The cam O and its connections, and the connections for operating the rack-bar c of the twisting-gears, are so timed with relation to each other that the twisting of the wires by the gears C takes place simultaneously with the revolving movement of the bobbin-carriers f by the gear N, and these connections are so arranged that the bobbin-carriers and the twisting-gears are revolved in the same direction at the same time and that the same number of turns is imparted to each.

The operation of the organization thus far described is as follows: The bobbins k being filled with wire, the wires l will be led from the bobbins, and after passing around the tension devices m will be led direct to the twisting-gears C and passed through the openings in the upper members of said gears, and thence carried to the mesh-shaping roll. The bobbins n being similarly supplied with wire, the wires p will be led from these bobbins, and after passing around the tension devices q will be passed through the openings in the shifting-arms s, and thence through the slots 2 and through the openings in the lower members of the twisting-gears, and thence to the mesh-shaping roll. The main shaft F being then set in motion, the cam M will operate the disk K and arms s, so as to move the wires p from the slots 2 into the recesses 3 of the bobbin-carriers f, as indicated in Fig. 8, and at the same time the bar a will be operated to shift the gears C, so as to cause the wire p, which is in the recess 3 of each bobbin-carrier, and the wire l from the bobbin k of that carrier, to pass through the openings of the two parts of the same gear. This having been accomplished, the cam O will operate to rock the frame 19, so as to bring the gear 18 or 23, as the case may be, into engagement with the gear 24, and as soon as this takes place the motion of the shaft F will be communicated to the gear 16, so as to impart a half-revolution to said gear and oscillate the gear N, so as to impart a number of turns to the bobbin-carriers, thereby carrying the wires l p around each other in one direction or the other, depending upon the direction in which the gear N is moved, and at the same time this takes place the rack-bar c will be operated to impart a corresponding number of turns in the same direction to the twisting-gears C, thereby imparting the requisite twist to the wires to form the meshes. As soon as this has been done the cam O will rock the frame 19, so as to throw both of the gears 18 23 out of engagement with the gear 24, and thus arrest the gear N, and the parts will be so timed that when the gear N and bobbin-carriers are thus arrested the recesses 3 will be in register with the slots 2, the same as at the commencement of the operation. The cam M will then operate to rock the disk K and arms s in the reverse direction, so as to carry the wires out of the recesses 3 into the slots 2 and thence on into the recesses 3 of the adjacent bobbin-carriers, and at the same time the bar a will be operated to correspondingly shift the gears C, and the mesh-forming mechanism will be operated to properly advance the wires. As soon as this has been done, the cam O will operate to rock the frame 19 in the reverse direction, thereby imparting a reverse movement to the gear N, and the bar c will at the same time impart a reverse movement to the twisting-gears, and so the operation will continue to be repeated.

In order to insure the retention of the wires p in the recesses 3 of the bobbin-carriers during the twisting operation, which has been explained, the frame G is provided upon its front side with a series of segmental plates w, (see Figs. 2, 3, and 6,) which are secured to the face of the frame by means of studs 25, which pass through slots in the plates, so as to permit the latter to have a limited range of movement toward and from the center of the frame. The plates $w$ are provided with springs 27, the tendency of which is to normally draw the plates inward toward the center of the disk, and the plates are provided with bowls 26, which are acted upon by cam projections 28, formed around the periphery of a disk P, which is mounted to turn freely upon the shaft L, the projections 28 being so arranged that when the disk P is in one position the projections will operate to move the segmental plates $w$ outward, while when the disk is in another position the projections 28 will be removed from the bowls 26, so as to permit the springs 27 to draw the plates inward. The plates $w$ are provided on their outer edges with curved projections 29, which pass between the spindles $g$ of the bobbin-carriers, and when the plates are moved outward by the cam projections 28 cover the slots 2 and overlap the edges of the bobbin-carriers. The projections 29 are, however, of such length that when the segmental plates $w$ are moved inward by the springs 27 the slots 2 will be uncovered, so as to permit the shifting of the wires, as before explained. It will be seen, however, that when the plates $w$ are moved outward, so that the projections 29 cover the slots 2 and overlap the edges of the bobbin-carriers, the wires will be retained in the recesses 3 and be prevented from moving out of said recesses until the plates $w$ are again moved inward.

For the purpose of operating the plates $w$ at the proper time with relation to the other parts the disk P is provided with an arm 30, which is connected by a rod 31 to a pivoted lever 32, having a stud or bowl which travels in the path of a cam R, mounted upon the shaft F. The cam R is so formed that at each half-revolution of the shaft F the disk P will be oscillated, so as to remove the projections 28 from the bowls 26 and permit the plates $w$ to be moved inward by their springs, and the parts are so timed that this inward movement of the plates $w$ will take place just after the twisting operation has been completed and before the shifting of the wires by the disk K, as before explained. The cam R, however, is so formed that immediately after the shifting of the wires $p$ has taken place and before the next twisting operation commences the disk P will be rocked in the reverse direction, so as to move the plates $w$ outward to retain the wires in the recesses into which they have been shifted, and the plates will remain in this position during the twisting operation, after which they will be moved inward again to permit the shifting, and so the operation will be repeated.

In some cases it will be preferable, instead of providing the carriers $f$ with spindles supporting bobbins, as has been described, to so construct them that they will be capable of receiving and carrying the necessary wire in the form of a cop or quill, formed by winding the wire spirally back and forth on itself until the proper size is obtained. When it is desired to carry the wire in this form, the spindles $g$ and the frames for supporting the bobbins will be omitted and the carriers will be cored out, so as to receive the cops, as indicated in Figs. 9 and 10, the cops being retained in the carriers by means of suitable frames or casings 33, attached to the carriers, as indicated, which frames will also carry the tension devices. The recesses 3 will be formed in the carriers the same as hereinbefore described; but in this case will be of less depth. The cops may project through both ends of the carriers, or through only one end, as preferred or found necessary. The operation will be the same as already described. These cops are more especially adapted for use with finer grades of wire and in producing netting having small meshes. By their use the distances between centers of the carriers can be reduced and a greater number of carriers can be placed in the same circumference.

In some cases it may not be desirable to provide the bobbin or cop carriers $f$ with two recesses 3 and the frame G with slots 2, which extend the entire distance between the bearings of adjacent carriers.

Figs. 11 to 13 illustrate a construction in which the carriers are provided with only one recess each, which is so arranged that when the carrier is in its normal position it registers with a slot 2, which opens outward through the bearing of the carrier. When the parts are in their normal position, as shown in the figures, the slots 2 afford communication between the recesses 3 of the adjacent carriers, the same as in the construction first described; but in order to transfer the wires from one carrier to another the movement of the shifter has to be somewhat modified, so as to cause the arms $s$ to move outward to carry the wires out of the recesses 3 and slots 2, then laterally, the same as before, to transfer the wires from a position over one slot to a position over the next one, and then inward to move the wires into the recesses 3 of the carriers. The arms $s$ may in this case be of substantially the form shown in the other figures of the drawings; but they will preferably be made in groups of two or more, as best shown in Fig. 12, in which the disk K is shown as provided around its periphery with a series of plates corresponding to the arms $s$ of the other figures, each plate being of sufficient width to receive three openings for the passage of the wires $p$, and thus form three of the arms $s$. The arms $s$ thus formed are secured to the disk K by means of bolts 34, which pass through slots in the arms and enter the disk, so as to permit the arms to have a radial movement toward and from the shaft L. The arms are also provided with springs 35, which are connected to studs projecting from the arms and from the disk K in such manner as to normally hold the arms in their innermost position, as shown. The necessary movement to carry the wires $p$ from a position over one of the carriers $g$ to a position over the next one is imparted to the disk K by means of a cam M, substantially the same as the cam which has already been described for moving the disk, but which acts directly upon a connecting-rod 36, pivoted to the disk.

For the purpose of imparting the necessary radial movement to the arms $s$ to raise the wires out of one carrier and lower them into the next adjoining one after they have been moved laterally, the arms are provided with studs or bowls 37, which are acted upon by a cam-disk S, which is mounted upon the shaft L and receives an oscillating movement through a rod 38 from a cam T, mounted upon the shaft F. The rods 36 38 are guided in their movements by means of studs 39, which extend from the frame-work H of the machine and pass through slots in the rods.

The operation of the mechanism when thus organized is as follows: After the twisting takes place the cam T operates to shift the cam-disk S and through the inclines 40, which act upon the bowls 37, move the arms $s$ outward, so as to raise the wires $p$ out of the recesses 3 in the carriers. Immediately after this takes place the cam M acts to move the disk K and the arms $s$ so as to carry the wires laterally from a position over the carriers, from which they have just been removed, to a position over the next adjacent carriers, and as soon as this has taken place the cam T again acts to move the disk S in the reverse direction, thereby allowing the springs 35 to move the arms $s$ inward and carry the wires into the recesses in the carriers over which they have been moved, and so the operation is repeated.

What we claim is—

1. The combination, with the rotary bobbin or cop carriers $f$, having the recesses 3, of the frame supporting said carriers and having slots 2, affording communication between the recesses of adjacent carriers, substantially as described.

2. The combination, with the rotary bobbin or cop carriers $f$, having the recesses 3, of the frame supporting said carriers and having slots 2, affording communication between the recesses of adjacent carriers, and a shifter for transferring the wires from one carrier to another, substantially as described.

3. The combination, with the rotary bobbin or cop carriers $f$, having recesses 3 upon their opposite sides, of the frame supporting said carriers and having the slots 2, affording communication between the recess in one side of each carrier and the recess in the adjacent side of the next carrier, substantially as described.

4. The combination, with the rotary bobbin or cop carriers $f$, having recesses 3 upon their opposite sides, of the frame supporting said carriers and having the slots 2, affording communication between the recess in one side of each carrier and the recess in the adjacent side of the next carrier, and a shifter for transferring the wires from one carrier to another, substantially as described.

5. The combination, with the rotary bobbin or cop carriers $f$, mounted in a circular frame and having the gears $t$, of the oscillating gear N, engaging with said gears $t$, to rotate the carriers alternately in reverse directions, and the cam O, oscillating frame 19, and connections for imparting an oscillating movement to said gear N, substantially as described.

6. The combination, with the rotary bobbin or cop carriers having the recesses 3, of the frame supporting said carriers and having slots 2, affording communication between the recesses of adjacent carriers, and the oscillating shifter K, for transferring the wires from one carrier to the adjacent one, substantially as described.

7. The combination, with the rotary bobbin or cop carriers having the gears $t$ and recesses 3, of the frame supporting said carriers and having the slots 2, affording communication between the recesses of adjacent carriers, the oscillating gear N, for rotating the carriers in reverse directions, and the oscillating shifter K, for transferring the wires from one carrier to the adjacent one, substantially as described.

8. The combination, with the rotary bobbin or cop carriers having the gears $t$ and recesses 3, of the frame supporting said carriers and having the slots 2, affording communication between the recesses of adjacent carriers, the oscillating gear N, for rotating the carriers in reverse directions, the oscillating shifter K, for transferring the wires from one carrier to the adjacent one, and the cam M and connections for oscillating said shifter, substantially as described.

9. The combination, with the frame G, affording bearings for the rotary bobbin-carriers, of the bobbin-carriers mounted in said frame and having spindles $g$, carrying frames for the bobbins, said spindles being of different lengths, whereby the bobbins are overlapped, substantially as described.

10. The combination, with the rotary bobbin or cop carriers having the recesses 3, of the movable retaining-plates $w$, for retaining the wires in the recesses of the carriers, substantially as described.

11. The combination, with the rotary bobbin or cop carriers having the recesses 3, of the movable retaining-plates $w$, for retaining the wires in the recesses of the carriers, and the disk P, having cam projections 28, for moving said plates $w$, substantially as described.

12. The combination, with the rotary bobbin or cop carriers having the recesses 3, of the movable retaining-plates $w$, for retaining the wires in the recesses of the carriers, the oscillating disk P, having cam projections 28, for moving the plates $w$, and the cam R and connections for oscillating said disk, substantially as described.

13. The combination, with the twisting-gears C, of the rotary bobbin or cop carriers having the recesses 3, the frame supporting said carriers and having the slots 2, affording communication between the recesses of adjacent carriers, and the shifter for transferring the wires from one carrier to the adjacent one, substantially as described.

14. The combination, with the twisting-gears C, of the rotary bobbin or cop carriers having the recesses 3 and gears $t$, the frame supporting said carriers and having the slots 2, affording communication between the recesses of adjacent carriers, the shifter for transferring the wires from one carrier to the adjacent one, and the gear N, for revolving the carriers, substantially as described.

In testimony whereof we have hereunto set our hands in the presence of two subscribing witnesses.

WILLIAM ORR.
WALTER C. ORR.

Witnesses:
A. D. CARNAGY,
EDMUND RIEDEL.